Figure 1:
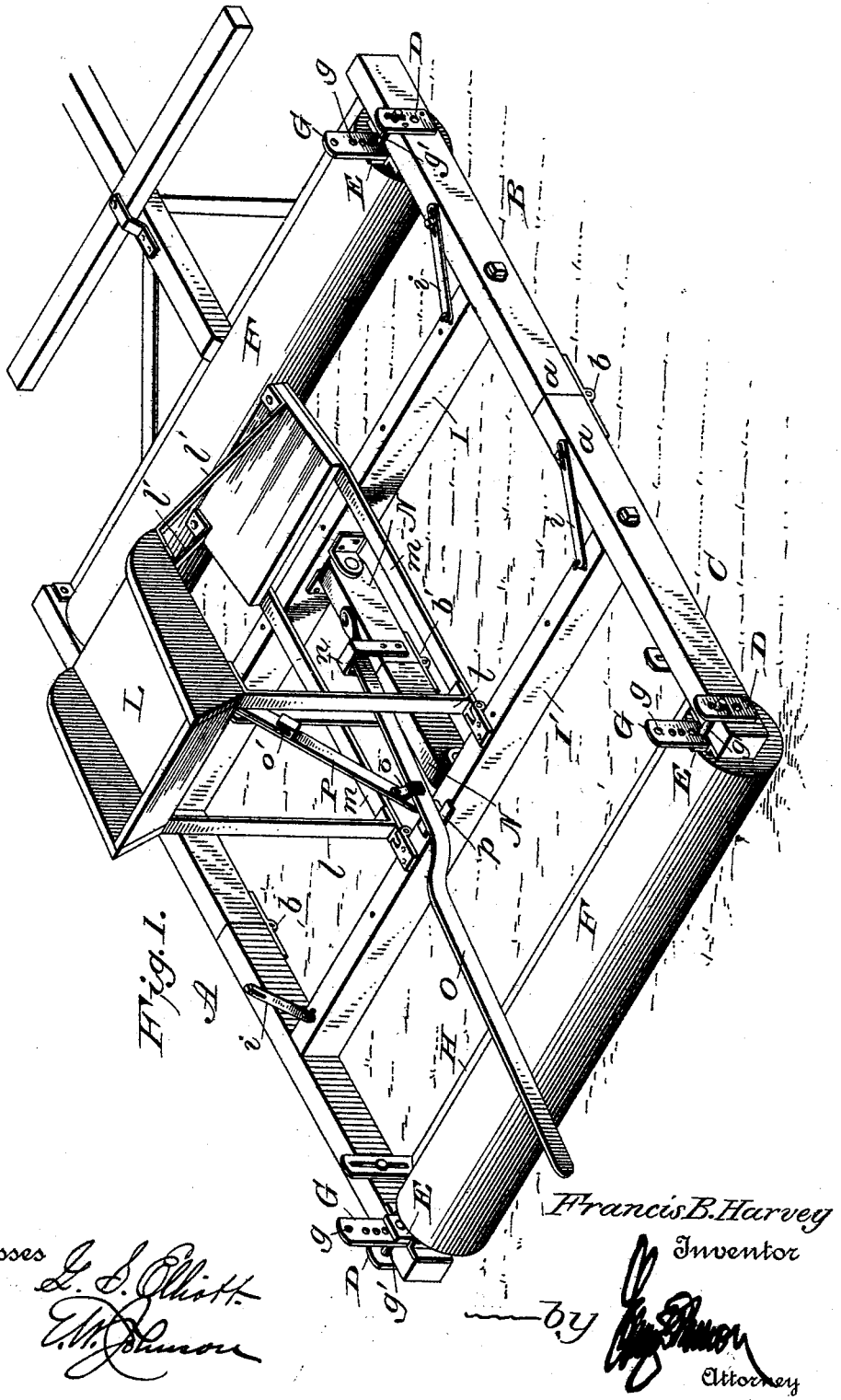

(No Model.)

F. B. HARVEY.
HARROW AND ROLLER.

No. 499,990. Patented June 20, 1893.

2 Sheets—Sheet 1.

Witnesses
L. S. Elliott
E. W. Johnson

Francis B. Harvey
Inventor
by
Attorney (No Model.)  2 Sheets—Sheet 2.
F. B. HARVEY.
HARROW AND ROLLER.
No. 499,990.  Patented June 20, 1893.
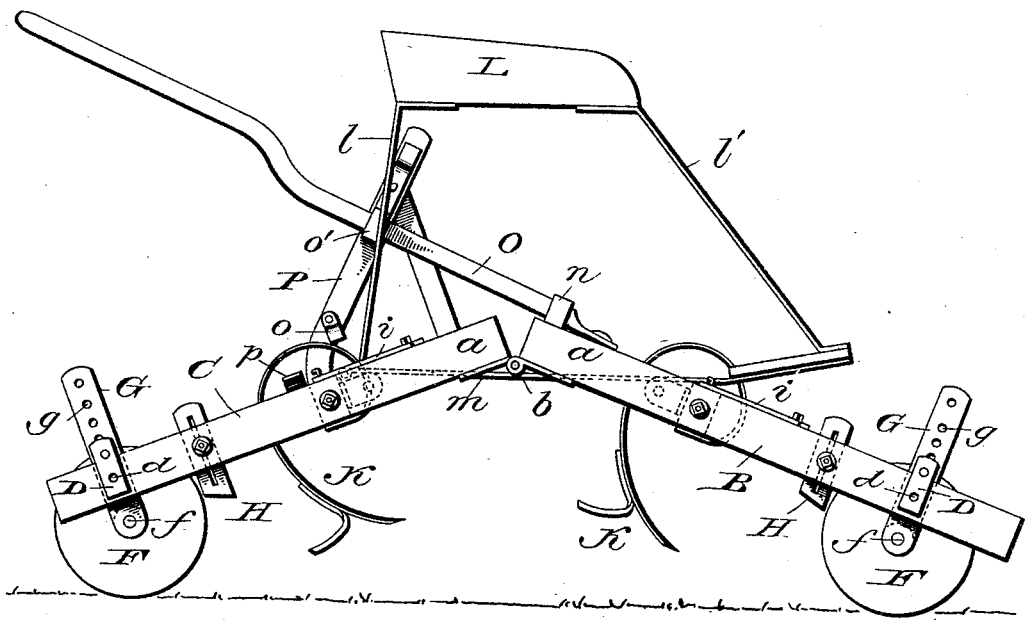
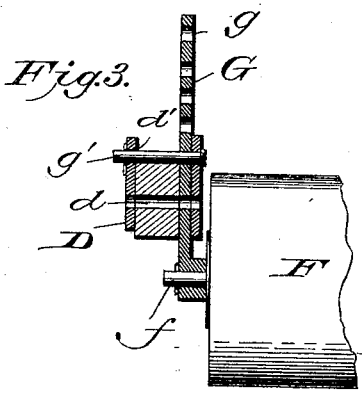
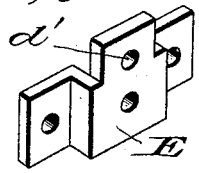
Witnesses  
L. S. Elliott  
E. W. Johnson
Francis B. Harvey.  
Inventor  
by  
Attorney

UNITED STATES PATENT OFFICE.

FRANCIS B. HARVEY, OF ATGLEN, PENNSYLVANIA.

HARROW AND ROLLER.

SPECIFICATION forming part of Letters Patent No. 499,990, dated June 20, 1893.

Application filed October 14, 1892. Serial No. 448,884. (No model.)

*To all whom it may concern:*

Be it known that I, FRANCIS B. HARVEY, a citizen of the United States of America, residing at Atglen, in the county of Chester and State of Pennsylvania, have invented certain new and useful Improvements in Harrows and Rollers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in rollers and harrows; the object of which is to provide a cultivating device of improved construction adapted to be used either as a roller or as a combined harrow or cultivator and roller, the parts being so constructed that the frame which carries the rollers may be adjusted so that the harrow or cultivator teeth will be elevated out of contact with the ground, and also with means for adjusting the rollers upon the frame so that the depth which the teeth will enter the ground may be regulated; and the invention consists in the construction and combination of the parts, as will be hereinafter fully set forth and particularly pointed out in the claims.

In the accompanying drawings forming part of this specification: Figure 1 is a perspective view of a roller and harrow constructed in accordance with my invention. Fig. 2 is a side elevation showing the frame arranged so that the cultivator or harrow teeth are located above the level of the ground. Fig. 3 is a detail view, in section, showing the manner of attaching the rollers to the frame. Fig. 4 is a detail view of one of the castings through which the roller support passes.

A designates the frame of the combined harrow and roller, said frame being made up of two sections B and C, the side beams $a$ $a$ of one section being hinged to the side beams $a$ $a$ of the other section by means of hinges $b$ $b$, the leaves of which are attached to the under side of the beams.

Near the forward ends of the side beams of the section B, and near the rear ends of the side beams of the section C are provided apertures $d$, each aperture registering with an aperture in a plate D attached on the outside of the beams, and with an aperture in a casting or plate E attached to the inner side of the beams. These plates also have apertures $d'$ located on a line with the upper edge of the beams. The plate E is provided with an outwardly bulged portion which receives the supports to which the rollers F F are journaled, the upper ends of these supports, G, having a series of perforations $g$ through which a headed bolt or pins $g'$ passes, said bolt $g'$ also passing through the upper apertures in the plates D and E to hold said supports rigidly in an adjusted position. The lower ends of the supports which receive the spindles $f$ of the rollers are enlarged as shown in Fig. 3 to form the bearing.

By the construction just described I provide a cheap, effective and convenient means for adjusting the rollers vertically with respect to the sections or frame, and by properly adjusting said rollers the cultivator or harrow teeth carried by the sections may be made to enter the ground to the desired depth.

H H designates scrapers, the ends of which are bent upwardly and provided with longitudinal slots, so that they can be adjusted to suit the position of the rollers.

I and I' designate transverse bars, the ends of which are suitably journaled to the longitudinal beams $a$ $a$, so that they may turn or have a rocking movement when desired, and these bars may be adjusted by the straps $i$, which are attached thereto and extend to the beams $a$, where they are provided with slots through which the securing bolts pass.

K designates the harrow or cultivator teeth, which are bolted or otherwise secured to the transverse bars I and I', said teeth being preferably of the construction shown; that is to say an improved form of spring tooth, though it is obvious rigid teeth may be used when desired.

L designates the seat, which is provided with standards $l$ and $l'$, the forward standard being secured to a suitable foot-rest and the rear ones to flat bars $m$, the rear ends of said bars having eyes which are pivoted to eyes attached to the upper edge of the transverse bar I'. The flat bars extend forwardly and the foot-rest is attached thereto. By this construction when the sections B and C are inclined with respect to each other the flat bars m will slide or move over the upper edge of the cross-bar I, so that the seat will be level irrespective of the inclination of the sections.

N N designate short bars which are hinged or pivotally connected to the cross-bars I and I' and are connected to each other by a hinge b' on the line with the hinges b b. The forward bar N carries a loop n beneath which passes the forward end of a lever O, the free end of said lever extending beyond the rear roller. At a suitable point this lever is adapted to engage with catches o and o' carried by the forwardly inclined bar P, the lower end of which is rigidly attached to the cross-bar I'. The cross-bar I' also carries a spring plate p which is adapted to bear against the under edge of the lever O and hold it in engagement with the catch o, said spring plate extending a sufficient distance upward to permit the lever to be lowered so that the spring and lever can be depressed to permit said lever to pass beneath the lower catch. If desired additional catches may be attached to the bar, so that the sections B and C may be held at different angles.

A draft tongue is secured to the front section B'.

When it is desired to transport the harrow and roller the parts can be arranged or adjusted as shown in Fig. 2 of the drawings, and when so arranged the harrow or cultivator teeth will be held out of contact with the soil, and when in use the sections B and C can be arranged to be held on a line with each other, when the teeth will enter the soil, the depth at which said teeth enter being regulated by adjusting the rollers with respect to the frame, and the angle of the teeth can be varied by turning the cross-bars I and I'.

Having thus described my invention, what I claim as new, and desire to secure by Letters Patent, is—

1. In a roller and harrow, the combination of the sections B and C hinged to each other and provided with vertically adjustable rollers, cross-bars I and I' carrying harrow or cultivator teeth, said bars being pivotally connected to the sections and to each other by means of bars N N, a lever connected to one of the bars N and adapted to engage with catches carried by a standard attached to the rear tooth-carrying bar, substantially as shown.

2. In a harrow and roller constructed substantially as shown, and provided with tooth-carrying bars I and I', a seat supporting frame attached to the rear tooth-carrying bar, said frame being adapted to move freely over the front tooth-carrying bar, for the purpose set forth.

3. In a harrow and roller, the combination of the longitudinal beams a a hinged centrally to each other, tooth-carrying bars I and I' pivotally attached thereto and provided with straps or braces i, bars N N pivotally attached to the tooth-carrying bars, said bars being hinged to each other, the forward bar carrying a loop or bail n with which a lever carried by said bar is adapted to engage, a standard P attached to the rear tooth-carrying bar, said standard having catches o and o', and a spring plate p for holding the lever in engagement with the lower catch, substantially as shown, and for the purpose set forth.

In testimony whereof I affix my signature in presence of two witnesses.

FRANCIS B. HARVEY.

Witnesses:
S. E. WEBER,
ISAAC RINEHART.